United States Patent
Jacobowitz et al.

(10) Patent No.: US 6,643,424 B2
(45) Date of Patent: Nov. 4, 2003

(54) SILICON OXYNITRIDE OPTICAL WAVEGUIDE SWITCH WITH WAVELENGTH LOCKED FEEDBACK CONTROL

(75) Inventors: Lawrence Jacobowitz, Wappingers Falls, NY (US); Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 09/944,274

(22) Filed: Aug. 31, 2001

(65) Prior Publication Data

US 2003/0169959 A1 Sep. 11, 2003

(51) Int. Cl.[7] .............................. G02B 6/26; G02B 6/42
(52) U.S. Cl. ............................................ 385/16; 385/37
(58) Field of Search ............................... 385/15–18, 37, 385/48

(56) References Cited

U.S. PATENT DOCUMENTS

| | | | | |
|---|---|---|---|---|
| 5,077,816 A | * | 12/1991 | Glomb et al. | 385/37 |
| 5,400,417 A | * | 3/1995 | Allie et al. | 385/2 |
| 5,737,077 A | * | 4/1998 | Lee et al. | 356/317 |
| 6,002,822 A | * | 12/1999 | Strasser et al. | 385/48 |
| 6,049,642 A | * | 4/2000 | Nakamura et al. | 385/16 |
| 6,130,973 A | * | 10/2000 | Lauzon et al. | 385/37 |
| 6,233,381 B1 | * | 5/2001 | Borrelli et al. | 385/37 |
| 6,434,286 B2 | * | 8/2002 | Hayashi et al. | 385/15 |
| 6,473,214 B1 | * | 10/2002 | Roberts et al. | 359/181 |

OTHER PUBLICATIONS

"Introduction to DWDM Technology Data in a Rainbow", by Stamatios V. Kartalopoulos, Lucent Technologies, Inc., IEEE communications Society, Sponsor, SPIE Optical Engineering Press, pp. 67–68.

"Introduction to DWDM Technology Data in a Rainbow", by Stamatios V. Kartalopoulos, Chapter 9, pp. 131–136.

"Distributed feedback semiconductor lasers", by John Carroll, et al., IEE Circuits, Devices and Systems Series 10, SPIE Press Monograph vol. PM52, 1998, pp. 7–15.

"Micromachining System Accommodates Large Wafers" Robert Bann et al., Laser Focus World, Jan. 2001, vol. 27 No. 1, pp. 189, 190 and 192.

* cited by examiner

Primary Examiner—Robert H. Kim
Assistant Examiner—Richard Kim
(74) Attorney, Agent, or Firm—Scully, Scott, Murphy & Presser; Tiffany Townsend, Esq.

(57) ABSTRACT

A silicon oxynitride (SiON)/silicon dioxide (SiO2) optical waveguide switch with a wavelength locked feedback control loop which monitors the wavelength of UV radiation produced by a UV tunable laser diffraction grating write source which has passed through a UV bandpass filter and is then used to selectively write a diffraction grating in the optical waveguide switch. The diffraction grating structure can be switched on or off at will, resulting in an optical switch element for IR radiation traveling through the optical waveguide. This optical switch element is a basic building block which can be used for many other systems, such as optical logic gates or all-optical cross connect switches for wide area networks. Further, it may be used to selectively tap off a portion of the optical signal, for example to read header information in a data stream (or packets) which indicates the destination switch port of the optical data, without disrupting the remaining optical data.

17 Claims, 5 Drawing Sheets

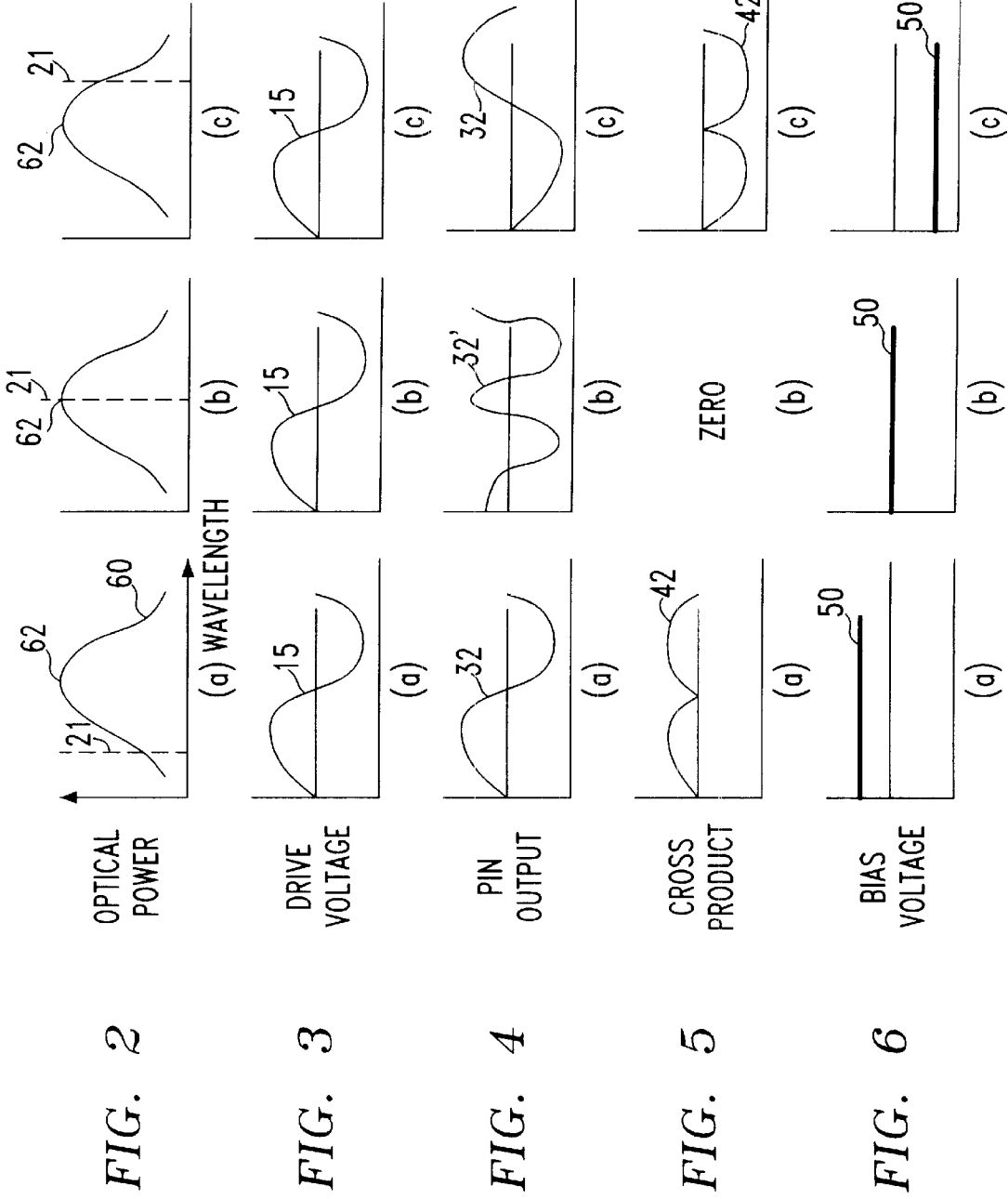

SILICON OXYNITRIDE OPTICAL WAVEGUIDE SWITCH WITH WAVELENGTH LOCKED FEEDBACK CONTROL

BACKGROUND OF THE INVENTION

1. Field of the Invention

The present invention relates generally to a silicon oxynitride (SiON)/silicon dioxide (SiO2) optical waveguide switch with a wavelength locked feedback control. More particularly, the invention pertains to a silicon oxynitride (SiON)/silicon dioxide (SiO2) optical waveguide switch with a wavelength locked feedback control loop which monitors the wavelength of UV radiation produced by a UV tunable laser diffraction grating write source which has passed through a UV bandpass filter and is then used to selectively write a diffraction grating in the optical waveguide switch.

2. Discussion of the Prior Art

Silicon oxynitride (SiON)/silicon dioxide (SiO2) planar optical waveguide structures, such as those developed by IBM Zurich research labs, offer many advantages over conventional waveguide structures. One feature which has not yet been exploited is their sensitivity to ultraviolet (UV) radiation, which produces a change in their refractive index of light at infrared wavelengths propagating in the waveguide. It is thus possible to use UV light to write a diffraction grating pattern in the waveguide core.

Possible alternatives include the introduction of fluorophores or chromophores with matched absorption wavelengths for extending their UV sensitivity to write, erase or rewrite Bragg gratings in the core waveguide, or to create surface-corrugated gratings in conjunction with surface acoustic wave devices to create modulation structures or tunable grating structures.

The explanations herein discuss both wavelength and frequency, which have a reciprocal relationship ($\lambda=c/f$, where c=speed of light), as is well known in the field of optics.

Wavelength Division Multiplexing (WDM) and Dense Wavelength Division Multiplexing (DWDM) are light-wave application technologies that enable multiple wavelengths (colors of light) to be paralleled into the same optical fiber with each wavelength potentially assigned its own data diagnostics. Currently, WDM and DWDM products combine many different data links over a single pair of optical fibers by re-modulating the data onto a set of lasers, which are tuned to a very specific wavelength (within 0.8 nm tolerance, following industry standards). On current products, up to 32 wavelengths of light can be combined over a single fiber link with more wavelengths contemplated for future applications. The wavelengths are combined by passing light through a series of thin film interference filters, which consist of multi-layer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

Ideally, a WDM laser would produce a very narrow linewidth spectrum consisting of only a single wavelength, and an ideal filter would have a square bandpass characteristic of about 0.4 nm width, for example, in the frequency domain. In practice, however, every laser has a finite spectral width, which is a Gaussian spread about 1 to 3 nm wide, for example, and all real filters have a Gaussian bandpass function. It is therefore desirable to align the laser center wavelength with the center of the filter passband to facilitate the reduction of crosstalk between wavelengths, since the spacing between WDM wavelengths are so narrow. In commercial systems used today, however, it is very difficult to perform this alignment—lasers and filters are made by different companies, and it is both difficult and expensive to craft precision tuned optical components. As a result, the systems in use today are far from optimal; optical losses in a WDM filter can be as high as 4 db due to misalignment with the laser center wavelength (the laser's optical power is lost if it cannot pass through the filter). This has a serious impact on optical link budgets and supported distances, especially since many filters must be cascaded together in series (up to 8 filters in current designs, possibly more in the future). If every filter was operating at its worst case condition (worst loss), it would not be possible to build a practical system. Furthermore, the laser center wavelengths drift with voltage, temperature, and aging over their lifetime, and the filter characteristics may also change with temperature and age. The laser center wavelength and filter bandwidth may also be polarization dependent. This problem places a fundamental limit on the design of future WDM networking systems.

A second, related problem results from the fact that direct current modulation of data onto a semiconductor laser diode causes two effects, which may induce rapid shifts in the center wavelength of the laser immediately after the onset of the laser pulse. These are (1) frequency chirp and (2) relaxation oscillations. Both effects are more pronounced at higher laser output powers and drive voltages, or at higher modulation bit rates. Not only can these effects cause laser center wavelengths to change rapidly and unpredictably, they also cause a broadening of the laser linewidth, which can be a source of loss when interacting with optical filters or may cause optical crosstalk. Avoiding these two effects requires either, non-standard, expensive lasers, external modulators (which are lossy and add cost), or driving the laser at less than its maximum power capacity (which reduces the link budget and distance). Lowering the data modulation rate may also help, but is often not an option in multi-gigabit laser links.

It would thus be highly desirable to provide a stable, optimal alignment between a laser center wavelength and the center of a Gaussian bandpass filter in order to optimize power transmission through such fiber optic systems and reduce optical crosstalk interference in optical networks.

SUMMARY OF THE INVENTION

Accordingly, it is a primary object of the present invention to provide a silicon oxynitride (SiON)/silicon dioxide (SiO2) optical waveguide switch with a wavelength locked feedback control loop which monitors the wavelength of UV radiation produced by a UV tunable laser diffraction grating write source which has passed through a UV bandpass filter and is then used to selectively write a diffraction grating in the optical waveguide switch.

The present invention concerns wavelength selective devices which encompass wavelength selective devices of all types including filters of all types including comb filters, etalon filters and rotatable disc filters and wavelength selective gratings of all types including Bragg gratings and array waveguide gratings.

It is an object of the present invention to provide a servo-control "wavelength-locked loop" circuit that enables real time mutual alignment of an electromagnetic signal having a peaked spectrum function including a center wavelength and a wavelength selective device implementing a peaked passband function including a center wavelength, in a system employing electromagnetic waves.

It is another object of the present invention to provide a servo-control system and methodology for WDM and DWDM systems and applications that is designed to optimize power through multi-gigabit laser/optic systems.

It is a further object of the present invention to provide a wavelength-locked loop for an optical system that enables real time alignment and tracking of any spectral device that selects a wavelength, such as a Bragg grating, in optical fibers and waveguides, etc., for use in WDM systems.

It is yet another object of the present invention to provide a servo/feedback loop for an optical system, referred to as a "wavelength-locked loop," that enables real time alignment of a laser with variable optical attenuators by offsetting an optical filter from a known transmission in optical fibers and waveguides, etc.

It is yet a further object of the present invention to provide a servo/feedback loop for an optical system, referred to as a "wavelength-locked loop," that may be used in light polarization applications.

It is still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that the optical loss of a WDM filter/laser combination is greatly reduced, thereby enabling significantly larger link budgets and longer supported distances.

It is yet still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that lower cost lasers and filters may be used providing a significant cost reduction in the WDM equipment.

When employed in laser/optical networks, the system and method of the present invention may be used to tune laser diode devices, and/or compensate for any type of wavelength-selective element in the network, including wavelength selective filters, attenuators, and switches, in fiber Bragg gratings, ring resonators in optical amplifiers, external modulators such as acousto-optic tunable filters, or array waveguide gratings. This applies to many other optical components in the network as well (for example, optical amplifiers that may act as filters when operating in the nonlinear regime). Furthermore, the system and method of the invention may be used to implement less expensive devices for all of the above application areas.

Alternately, the system and method of the invention may be implemented to tune such devices for WDM and optical network applications, in real-time, during manufacture, e.g., tuning all lasers to a specific wavelength. This would significantly increase lot yields of laser devices which otherwise may be discarded as not meeting wavelength specifications as a result of manufacture process variations, for example.

The wavelength locked loop of the present invention enables a tighter control of wavelength, which allows an increased density of wavelength channels with less cross talk between channels in a wavelength multiplex system, which might typically include 32 or 64 channels or links.

Pursuant to the present invention, each channel includes a separate wavelength locked loop which includes a separate source such as a laser and wavelength selective device such as a filter. Accordingly a wavelength multiplex system can include an array of 32 or 64 lasers and an array of 32 or 64 filters.

BRIEF DESCRIPTION OF THE DRAWINGS

The foregoing objects and advantages of the present invention for a silicon oxynitride (SiON)/silicon dioxide (SiO2) optical waveguide switch with a wavelength locked feedback control may be more readily understood by one skilled in the art with reference being had to the following detailed description of several embodiments thereof, taken in conjunction with the accompanying drawings wherein like elements are designated by identical reference numerals throughout the several views, and in which:

FIGS. 2(a)–2(c) are signal waveform diagrams depicting the relationship between laser optical power as a function of wavelength for three instances of optic laser signals;

FIGS. 3(a)–3(c) are signal waveform diagrams depicting the laser diode drive voltage dither modulation (a sinusoid) for each of the three waveform diagrams of FIGS. 2(a)–2(c);

FIGS. 4(a)–4(c) are signal waveform diagrams depicting the resulting feedback error signal output of the PIN diode for each of the three waveform diagrams of FIGS. 2(a)–2(c);

FIGS. 5(a)–5(c) are signal waveform diagrams depicting the cross product signal resulting from the mixing of the amplified feedback error with the original dither sinusoid;

FIGS. 6(a)–6(c) are signal waveform diagrams depicting the rectified output laser bias voltage signals which are fed back to adjust the laser current and center frequency;

DETAILED DESCRIPTION OF THE INVENTION

The present invention provides a novel servo-control system implemented for optical systems including light sources, such as lasers, and frequency selective devices, such as bandpass filters. The servo-control system, herein referred to as the "wavelength-locked loop" or "lambda-locked loop" (since the symbol lambda is commonly used to denote wavelength), implements a dither modulation to continuously adjust an electromagnetic signal source characterized as having a peaked frequency spectrum or peaked center wavelength, e.g., laser light, so as to track the center of a frequency selective device, e.g. a filter passband. In this manner, optimal power of the signal is transmitted and optimal use is made of the system transmission bandwidth.

Figure 1A:
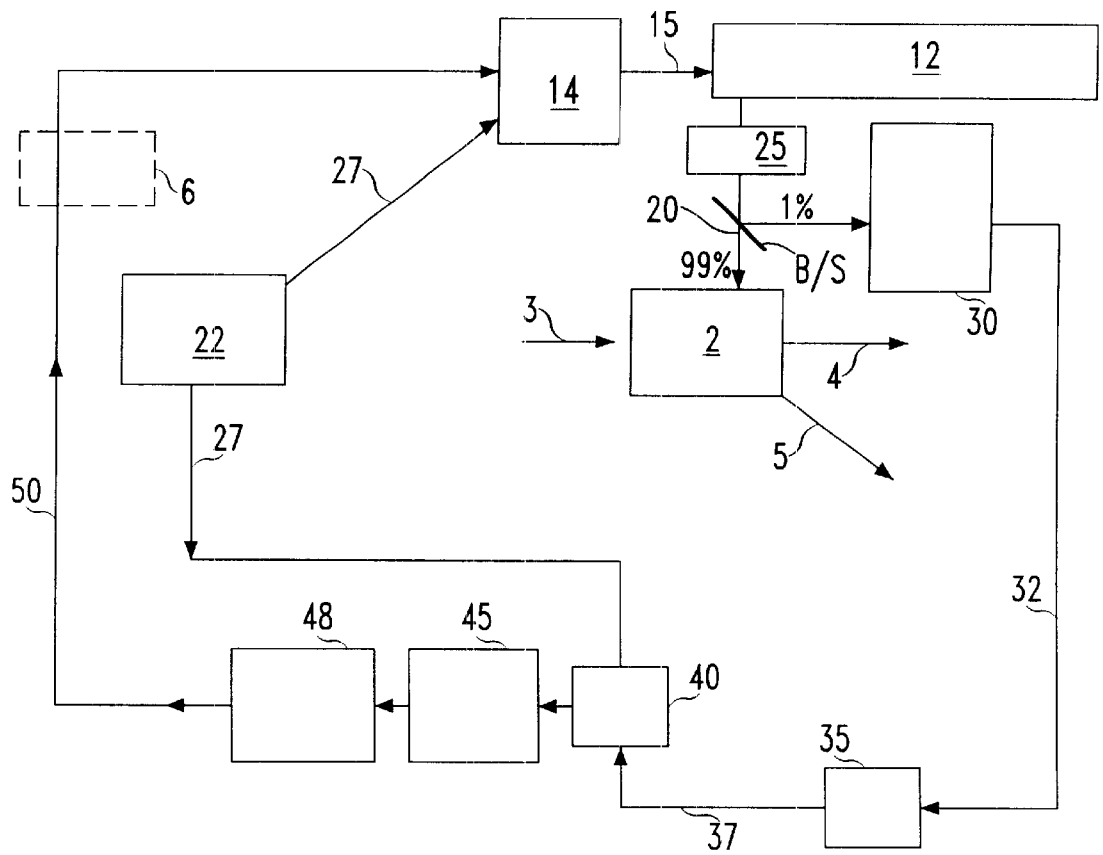
FIG. 1(a) illustrates an embodiment of a silicon oxynitride (SiON)/silicon dioxide (SiO2) optical waveguide switch with a dither-operated, wavelength-locked feedback control loop.

Referring to FIG. 1(a), the present invention controls a UV write beam 20 with a wavelength locked feedback loop for a silicon oxynitride (SiOn)/silicon dioxide (SiO2) planar optical waveguide structure 2, such that a diffraction grating structure can be switched on or off at will, resulting in an optical switch element for IR radiation 3 traveling through the optical waveguide. This optical switch element is a basic building block which can be used for many other systems, such as optical logic gates or all-optical cross connect switches for wide area networks. Further, it may be used to selectively tap off a portion of the optical signal, for example to read header information in a data stream (or packets) which indicates the destination switch port of the optical data, without disrupting the remaining optical data.

The dither-controlled, wavelength-locked feedback control loop monitors the wavelength of UV radiation produced by a UV tunable laser diffraction grating write source 12 which has passed through a UV bandpass filter 25. The UV write beam is then used to selectively write a diffraction grating in the optical waveguide switch 2. The wavelength of the UV tunable write source 12 is controlled to selectively generate a UV write beam at the proper UV wavelength to write the diffraction grating in the optical waveguide, or not, such that it functions as an optical switch, directional coupler, or header tap for IR radiation 3 traveling through the optical waveguide 2.

A small portion of the optical write signal passing through the UV bandpass filter is split off by a beam splitter B/S and is detected by a detector 30, and a dithered wavelength-locked feedback control loop is used to adjust the wavelength of the UV write beam source 12. The wavelength of the UV write source 12 is modulated by an external sinusoidal dither signal 27, and its center wavelength is adjusted by a control voltage 50 which is derived from the feedback loop to align with the center wavelength of the UV bandpass filter 25 to write the diffraction pattern in the optical waveguide. The writing laser power remains constant, and only its wavelength is changed with respect to the UV bandpass filter.

The UV bandpass filter 25 is selected with a center UV wavelength that will write a diffraction grating in the waveguide. If the center wavelength of the UV laser write source is adjusted to lie at the center wavelength of the UV bandpass filter, then the peak optical power is transmitted by the UV bandpass filter 25 and a diffraction grating is written in the optical waveguide which deflects the IR light 3 passing through the waveguide from an undeflected path 4 to a deflected path 5, such that the waveguide 2 can function as an optical switch, as desired.

The UV source 12 can be effectively turned off by detuning the center wavelength of the UV laser write source with respect to the center wavelength of the UV filter 25, which results in no grating being written in the optical waveguide, and the IR light passing through the optical waveguide remains undeflected along path 4.

Various controls are available to adjust the center wavelength of the UV write laser 12, which are controlled by an externally applied voltage 50 which is derived from the feedback loop. The center wavelength of the write laser 12 is modulated by a dither signal from an external dither oscillator 22 at a low modulation frequency (kHz or less is adequate; this may be adjusted as needed to avoid interference with other operating frequencies in the system). Variations in the laser bias produce a corresponding dither in the center wavelength of the laser output This light passes through the UV bandpass filter 25 whose center wavelength is chosen to match the UV wavelength sensitivity of the SiON waveguide 2.

The output light from the filter 25 passes through a beam splitter B/S, which directs a small portion of the light to a PIN diode detector 30. The detector's electrical output signal is amplified at 35 and fed back to a control circuit, where it is multiplied at 40 with the original sinusoidal dither signal 27 used to modulate the wavelength of the laser diode 3. This results in the generation of the cross product of the two signals. The result is low pass filtered at 45 to remove higher-order terms, and is then integrated and preferably digitized at 48 to obtain a signal 50 which is proportional to the offset between the center wavelength of the laser 12 and the center wavelength of the filter 25. This offset signal 50 indicates whether the laser and filter center wavelengths are properly aligned, and if not indicates both the amount and direction in which the laser center wavelength must be shifted to become properly aligned with the filter center wavelength. The relative alignment of the laser and filter center wavelengths determines whether the light emerging from the filter is sufficiently intense to write a grating in the SiON waveguide. This signal 50 then passes into an optional digital logic control circuit 6, whose function is to adjust the state of the feedback signal to the bias voltage control 14 for the write-beam source 12 depending on whether or not a grating is desired to be written in the waveguide. This may be a preprogrammed instruction or a user input.

If it is desired to switch the IR light along path 5, then the center wavelengths of the laser and the filter must be in alignment. If the feedback signal 50 indicates they are already aligned, then the logic circuit 6 output is zero and no change is made to the state of the laser center wavelength. If they are not aligned, the feedback signal 50 is used to determine in which direction and by what amount the drive control of the laser 12 should be changed to bring them into alignment. This control signal is then fed back into the laser drive voltage 14.

In a similar manner, if it is desired not to switch the IR light along path 5, then the center wavelengths of the laser and filter must be out of alignment. If the feedback signal 50 indicates they are not aligned, then the logic circuit 6 output is zero and no further change is made to the laser state. If the feedback signal indicates they are aligned, then the feedback signal is used to determine in which direction and by what amount the write wavelength should be changed to bring them out of alignment.

The photodiode 30 output current is proportional to the dither modulation of the light intensity, and is amplified by an amplifier 35 and is then mixed with the original dither signal in a multiplier 40 to produce a vector cross product. The output of the multiplier is then filtered at 45 to pass the vector cross product, which is then integrated, and preferably digitized, at 48 to produce a feedback control signal. This feedback signal is an important element of the present invention as it enables the control circuit 14 to shift or change the wavelength of the laser 12 by the correct amount and in the proper direction to bring it into closer alignment with the center wavelength of the filter 25 passband. Since this is an active feedback process, it can be used to correct for changes in the laser or filter properties such as those caused by ageing or temperature changes.

The feedback loop is stable for a wide range of conditions, and may be implemented as a variant on an externally excited adaptive loop design familiar from control systems theory. Note that the feedback loop acts as a high level state machine, compensating for all of the internal variables (wavelength selectivity) of the laser diode and the filter with a single mechanism that stabilizes the laser and locks the wavelength to any desired value.

The wavelength-locked loop (WLL) is now described in further detail with reference to FIGS. 1(b) and 2–9. The basic operating principle of the wavelength-locked loop (WL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

Figure 1B:
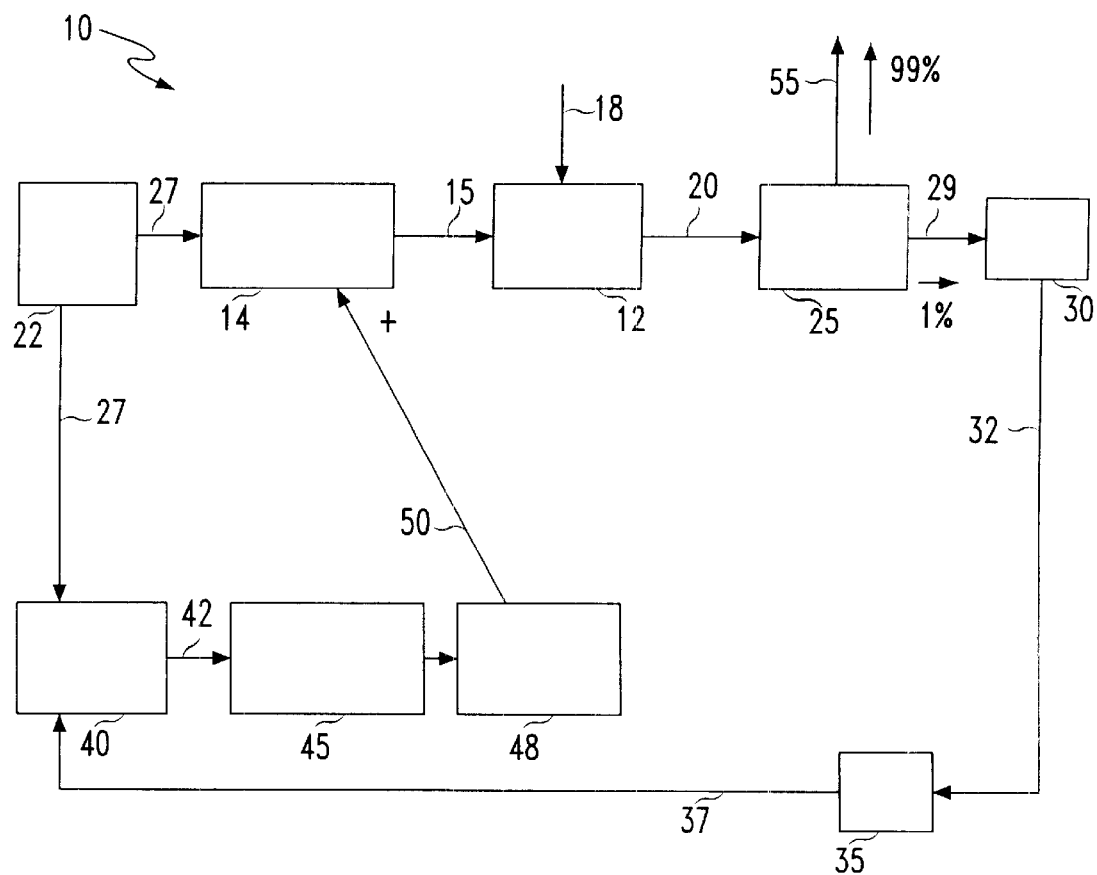
FIG. 1(b) illustrates a wavelength tunable laser diode wherein the wavelength of the laser diode is tuned by using a dither-operated, wavelength locked feedback loop.

FIG. 1(b) depicts an exemplary optical system 10 including a light source such as laser diode 12 driven with both a bias voltage 15 from a voltage bias circuit 14. The laser diode generates an optical (laser light) signal 20 that is received by a bandpass filter 25, or any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. The bandpass filter may comprise a thin film interference filter comprising multiple layers of alternating refractive indices on a transparent substrate, e.g., glass.

As further shown in FIG. 1(b), there is an added sinusoidal dither modulation circuit or oscillator 22 for generating a sinusoidal dither modulation that modulates the UV write source laser wavelength to vary the wavelength thereof. The dither modulation frequency is on the order of a few kilohertz (kHz) but may range to the Megahertz range. Preferably, the dither modulation frequency is much less than an associated data rate which is typically on the order of 1–10 GHz.

Preferably, the beam splitter B/S is designed to tap off a small amount of light, for example, which is incident upon a photo detector receiver device, e.g., PIN diode 30, and converted into an electrical feedback signal 32. The amount of light that may be tapped off may range anywhere between one percent (1%) to five percent (5%) of the optical output signal, for example, however; skilled artisans will appreciate any amount of laser light above the noise level that retains the integrity of the output signal including the dither modulation characteristic, may be tapped off. The remaining laser light passes onto the SiON waveguide 2. As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 27. The cross product signal 42 that results from the multiplication of the amplified PIN diode output (feedback signal) 37 and the dither signal 27 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the UV write source laser wavelength control 14. In this manner, the laser wavelength will increase or decrease until it exactly matches the center of the filter passband. Alternately, the error signal 50 may be first converted to a digital form prior to input to the UV write source laser wavelength control.

According to one aspect of the invention, the WLL will automatically maintain tracking of the laser center wavelength to the peak of the optical filter. However, in some cases, it may not be desirable to enable laser alignment to the filter peak, e.g., in an optical attenuator. Thus, as shown in the embodiment depicted in FIG. 8, there is provided an optional external tuning circuit herein referred to as a wavelength shifter device 51, that receives the error signal and varies or offsets it so that the laser center wavelength may be shifted or offset in a predetermined manner according to a particular network application. That is, the wavelength shifter 51 allows some external input, e.g., a manual control element such as a knob, to introduce an arbitrary, fixed offset between the laser center wavelength and the filter peak.

Figure 7:
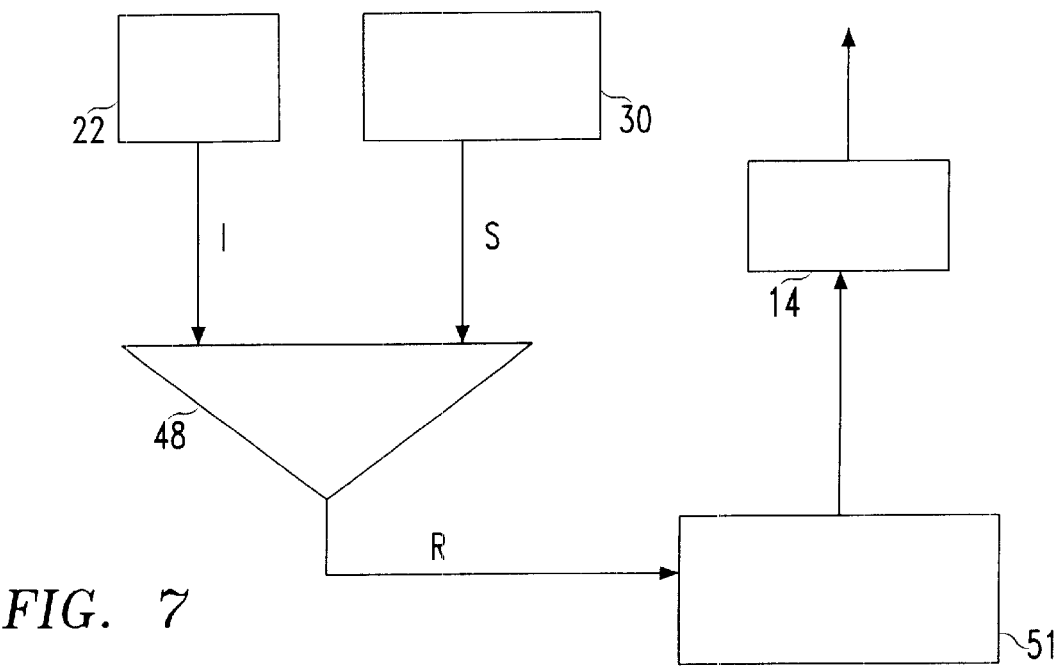
FIG. 7 is a generalized circuit diagram depicting how dithering is implemented in the WLL system of the present invention.

A generalized description of how dithering is implemented for providing a WLL in the present invention is now provided in view of FIG. 7. As shown in FIG. 7, the sinusoidal dither generator (harmonic oscillator) 22 produces a dither signal 27 which causes the laser center wavelength to oscillate with a small amplitude about its nominal position. After passing thru the optical bandpass filter, the laser wavelength variation is converted into intensity variation which is detected by the photodetector circuit 30 (e.g., photodiode). The servo loop feeds back the photodiode output signal, S, and takes a vector cross product with the original sinusoidal dither, I. The cross product result is averaged (integrated) over a time period T by 48 and may be sampled and digitized to produce the equivalent of an error detect signal, R, which is bipolar and proportional to the amount by which the laser center wavelength and filter center wavelength are misaligned. Optionally, the signals may be normalized to account for variations in the laser power output from the filter. Optionally, an external tuning circuit 51 may be implemented to receive the error signal and enable the laser center wavelength offset to vary to an arbitrary value. Finally, the error signal R is fed back to be used by the UV write source laser wavelength control 14 to adjust the laser center wavelength in the proper direction to better align with the filter center wavelength.

The operating principle is further illustrated in the timing and signal diagrams of FIGS. 2–6. FIGS. 2(a)–2(c) particularly depicts the relationship between laser optical power as a function of wavelength for three instances of optic laser signals: a first instance (FIG. 2(a)) where the laser signal frequency center point 21 is less than the bandpass function centerpoint as indicated by the filter bandpass function 60 having centerpoint 62 as shown superimposed in the figures; a second instance (FIG. 2(b)) where the laser frequency center point 21 is aligned with the bandpass function centerpoint 62; and, a third instance (FIG. 2(c)) where the laser frequency center point 21 is greater than the bandpass function centerpoint 62. In each instance, as depicted in corresponding FIGS. 3(a)–3(c), the UV write source laser drive voltage signal 15 is shown dithered (a sinusoid) resulting in the laser wavelength dithering in the same manner. The dithered laser diode spectra passes through the filter, and is converted to electrical form by the PIN diode 30. In each instance of the laser signals depicted in FIGS. 2(a) and 2(c) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 4(a) and 4(c). It is noted that for the laser signals at frequencies below the peak (FIG. 2(a)) the feedback error signal 32 corresponds in frequency and phase to the dither signal (FIG. 4(a)), however for the laser signals at frequencies above the peak (FIG. 2(c)) the feedback error signal 32 corresponds in frequency but is 180° opposite phase of the dither signal (FIG. 4(c)). Due to the bipolar nature of the feedback signal (error signal) for cases when the laser signal centerpoint is misaligned with the bandpass filter centerpoint, it is thus known in what direction to drive the UV write source laser (magnitude and direction), which phenomena may be exploited in many different applications. For the laser signal depicted in FIG. 2(b) having the laser frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 4(b) showing a feedback error signal at twice the frequency of the dither frequency.

Thus, in each instance, as depicted in corresponding FIG. 4(b), the resulting feedback signal exhibits frequency doubling if the laser center wavelength is aligned with the filter center wavelength; otherwise it generates a signal with the same dither frequency, which is either in phase (FIG. 4(a)) or out of phase (FIG. 4(c)) with the original dither modulation. It should be understood that, for the case where the laser center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling at opposite phases depending upon whether the laser center frequency is inboard or outboard of the filter center frequency. Thus, even though partial frequency doubling is detected, it may still be detected from the feedback signal in which direction and magnitude the laser signal should be driven for alignment.

Thus, referring now to FIGS. 5(a) and 5(c), for the case when the laser and filter are not aligned, the cross product signal 42 resulting from the mixing of the amplified feedback error with the original dither sinusoid is a signed error signal either at a first polarity (for the laser signals at frequencies below the bandpass filter centerpoint), such as shown in FIG. 5(a) or, at a second polarity (for the laser signals at frequencies above the bandpass filter centerpoint), such as shown in FIG. 5(c). Each of these signals may be rectified and converted into a digital output laser bias voltage signal 48 as shown in respective FIGS. 6(a) and 6(c), which are fed back to respectively increase or decrease the laser current (wavelength) in such a way that the laser center wavelength moves closer to the bandpass filter centerpoint. For the case when the laser and filter are aligned, the cross product generated is the frequency doubled signal (twice the frequency of the dither) as shown in the figures. Consequently, this results in a 0 V dc bias voltage (FIG. 6(b)) which will maintain the laser frequency centerpoint at its current wavelength value.

In order to describe further benefits of the invention, it is first noted that although it may appear that if a filter bandpass is larger than the laser linewidth, then the entire optical pulse will pass through the filter unaffected. However, this is clearly not the case; the laser spectra and filter function are both Gaussian, in both time and wavelength (reciprocal of frequency). Thus, passing the laser spectra through the filter results in a convolution between the spectrum and filter functions. Implementing analog signal processing, an output optical spectrum is produced which is actually narrower than the input spectra (i.e., some of the light is lost during filtering). In a real WDM system there may be at least two (2) bandpass filter devices in a link to perform multiplex/demux functions at either end: in practice, there may be many bandpass filters configured in series. This leads to a secondary problem: when two filters are in series and their bandpass centers are not aligned, the original signal must be convolved with both filter functions; this narrows the signal spectra even further, at the cost of lowering the optical power by discarding the edges of the light spectra. A succession of filters not aligned with each other can be shown to have the same characteristics as a single, much narrower, filter. This further reduces the margin for misalignment between the laser and multiple filters. For example, even if the ideal center to center, wavelength spacing of a WDM system is 0.8 nm, due to misalignment between the mux and demux filters this window may be reduced to approximately 0.4 nm or less. This would require extreme precision and stability for the laser, wavelength, making for a very expensive laser transmitter. Thus, there are really two problems to be solved: (1) laser to filter alignment; and, (2) filter to filter alignment. Note that when signals propagate through a fiber optic network and traverse multiple filters the wavelength may shift due to these effects combined with temperature and environmental effects. It is a real, practical problem to keep an input wavelength the same throughout the network, so that network architectures such as ring mesh, wavelength reuse, and wavelength conversion may work properly, i.e., this is called frequency referencing.

The present invention addresses frequency referencing as it can handle both of these instances. For example, as shown in FIG. 8, there is depicted a general block diagram depicting the underlying system architecture employing the wavelength-locked loop technique in an optical system 10' employing a series connection of two bandpass filters 25a, 25b.

Figure 9:
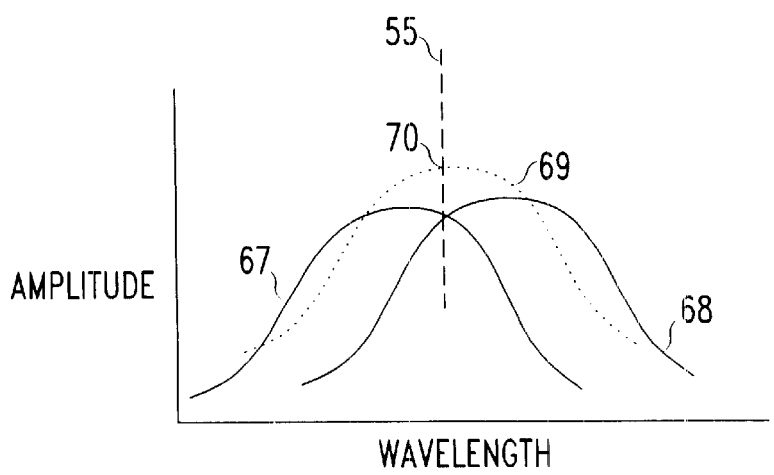
FIG. 9 is a signal waveform diagram depicting the relationship between laser optical power as a function of wavelength for the case of aligning a laser signal through a system including two bandpass filters in series, as depicted in FIG. 8.
Figure 8:
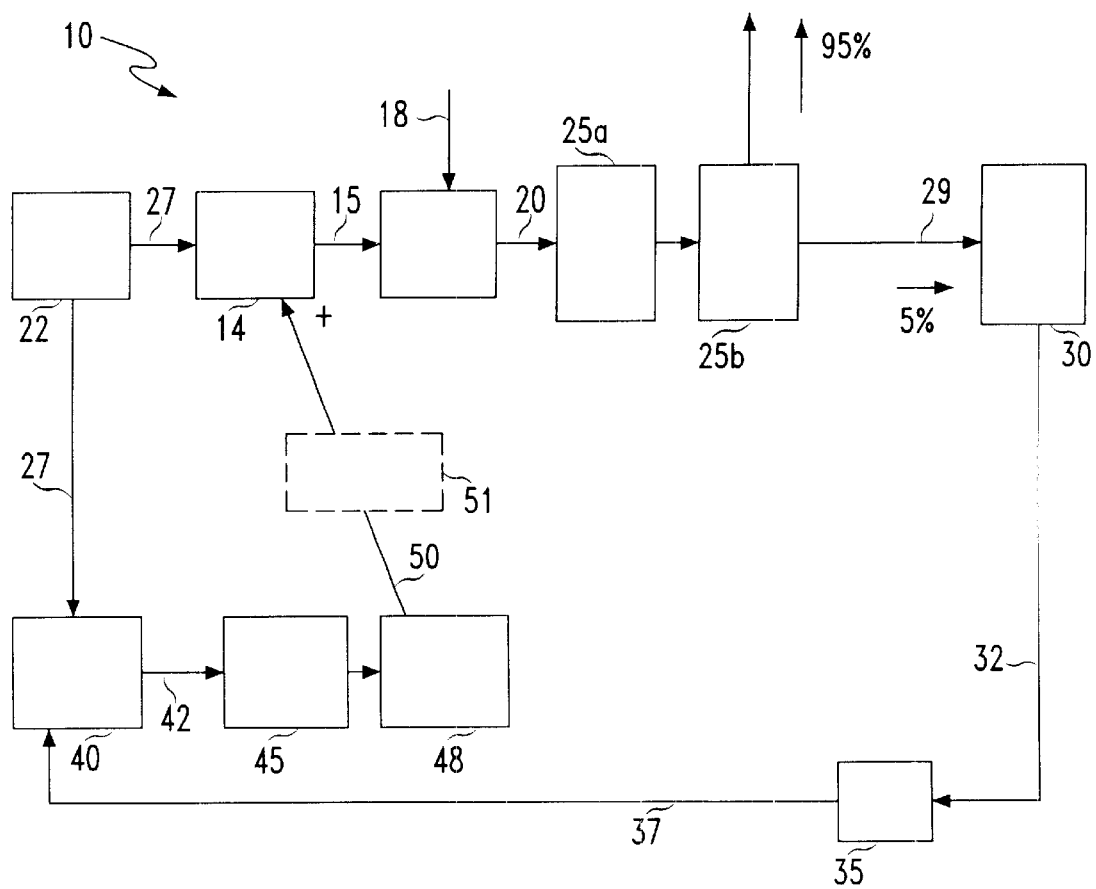
FIG. 8 is a general block diagram depicting the underlying system architecture for employing an optional wavelength shifter in the wavelength-locked loop technique, and also an optical system employing two bandpass filters according to the present invention.

FIG. 9 depicts each of the individual filter responses 67 and 68 for the two bandpass filters 25a, 25b of FIG. 8 and the corresponding composite filter response 69 having a centerpoint or peak 70. When performing filter to filter or multiple filter alignment, the technique of the invention depicted in FIG. 8 may be implemented to tune the laser signal 55 to have a center frequency such that maximum power transfer will occur through the series connection of two bandpass filters as represented by its composite filter response 69 (FIG. 9). Generally, a cascade of bandpass filters results in an effective narrowing of the overall passband, as the net filter response is a convolution of the component filter responses. The WLL can align the laser center wavelength with the middle of this composite passband.

The system and method of the present invention may be used to tune a laser wavelength to compensate for any type of wavelength-selective element in a network, including wavelength selective switches, tunable filters, in fiber Bragg gratings, ring resonators in optical amplifiers, external modulators such as acousto-optic tunable filters, or array waveguide gratings. This applies to many other optical components in the network as well (for example, optical amplifiers that can act as filters when operating in the nonlinear regime). This method may additionally be used to implement less expensive devices for all of the above application areas. As the optical loss of a WDM filter/laser combination is greatly reduced by implementing the technique of the invention, significantly larger link budgets and longer distances may be supported. Further, the invention permits much lower cost lasers and filters to be used; since these are the most expensive parts of a WDM device today, there is a significant cost reduction in the WDM equipment.

While several embodiments and variations of the present invention for a silicon oxynitride (SiON) optical waveguide switch with wavelength locked feedback control are described in detail herein, it should be apparent that the disclosure and teachings of the present invention will suggest many alternative designs to those skilled in the art.

Having thus described our invention, what we claim as new and desire to secure by Letters Patent is:

1. A silicon oxynitride (SiON)/silicon dioxide (SiO2) optical waveguide switch comprising:
   a SiON/SiO2 optical waveguide structure;
   a UV wavelength tunable diffraction grating write source for generating a UV write beam for writing a diffraction grating pattern in the optical waveguide;
   a dither source producing a dither signal for modulating the wavelength of the UV tunable write source;
   a UV bandpass filter, receiving the UV write beam, and passing a center wavelength which will write the diffraction pattern in the optical waveguide;
   a dither-operated, wavelength-locked feedback loop, sampling the output of the UV bandpass filter and generating a feedback control signal for controlling the wavelength of the UV write source to write the diffraction grating pattern in the optical waveguide, or not
   a logic circuit for controlling the TV write source, wherein:
      to write the diffraction pattern, and if the feedback control signal indicates that the center wavelengths of the UV write source and the UV filter are aligned, then the logic circuit output is zero card no change is made to the center wavelength of the UV write source, and if the center wavelength of the UV write source and the UV filter are not aligned, the feedback control signal is used to determine in which direction and by what amount the drive signal of the UV write source is changed to bring them into alignment, and the feedback control signal is fed back to the UV write source
      to not write the diffraction pattern and if the feedback control signal indicates that the center wavelengths of the UV write source and the UV filter are not aligned, the logic output is zero and no change is made to the center wavelength of the UV write source, and if the feedback control signal indicates that the center wavelengths of the UV write source and the UV filter are aligned, then the feedback signal determines in which direction and by what amount the drive signal of the UV write source is changed to bring them out of alignment.

2. The SiON/SiO2 optical waveguide switch of claim 1, including an infrared (IR) light source for directing IR light through the optical waveguide, wherein a written diffraction pattern in the optical waveguide deflects the IR light through the optical waveguide from a nondeflected path to a deflected path.

3. The SiON/SiO2 optical waveguide switch of claim 2, wherein the written diffraction pattern optical switch functions as a directional coupler for infrared (IR) radiation traveling through the optical waveguide.

4. The SiON/SiO2 optical waveguide switch of claim 2, wherein a portion of the IR light is selectively tapped off to read header information in an optical data stream which indicates a destination switch port of the optical data stream.

5. The SiON/SiO2 optical waveguide switch of claim 1, wherein the UV write beam is turned off by detuning the center wavelength of the UV write source with respect to the center wavelength of the UV filter, which results in no grating being written in the optical waveguide.

6. The SiON/SiO2 optical waveguide switch of claim 1, wherein the dither source comprises an oscillator operating at a low modulation frequency of kHz or less to avoid interference with other operating frequencies.

7. The SiON/SiO2 optical waveguide switch of claim 1, wherein the feedback loop includes a detector for detecting a portion of the output light from the filter, an amplifier for amplifying the detector electrical output signal, a multiplier for multiplying the detector electrical output signal with the dither signal to produce a cross product signal of the two signals, a low pass filter for filtering the cross product signal, and an integrator for integrating low pass filtered signals to obtain the feedback control signal which is proportional to the offset between the center wavelength of the UV write source and the center wavelength of the UV filter.

8. The SiON/SiO2 optical waveguide switch of claim 1, further comprising a logic control circuit whose function is to adjust the state of the feedback control signal depending upon to whether or not a diffraction grating is desired to be written in the optical waveguide.

9. The SiON/SiO2 optical waveguide switch of claim 1, wherein the UV wavelength tunable diffraction grating write source comprises a laser diode.

10. A method of operating a silicon oxynitride (SiON)/silicon dioxide (SiO2) optical waveguide switch comprising:
    generating a UV write beam with a UV wavelength tunable diffraction grating write source for writing a diffraction grating pattern in a SiON/SiO2 optical waveguide;
    producing a dither signal for modulating the wavelength of the UV tunable write source;
    receiving the UV write beam with a UV bandpass filter, and passing a center wavelength which will write the diffraction pattern in the optical waveguide;
    sampling the output of the UV bandpass filter and generating a feedback control signal, a dither-operated, wavelength-locked loop, for controlling the wavelength of the UV write source to write the diffraction grating patter in the optical waveguide, or not;
    adjusting the state of the feedback control signal, wherein:
       to write the diffraction pattern, and if the feedback control signal indicates that the center wavelengths of the UV write source and the UV filter are aligned, then the logic circuit output is zero and no change is made to the center wavelength of the UV write source, and if the center wavelength of the UV write source and the UV filter are not aligned, the feedback control signal is used to determine in which direction and by what amount the drive signal of the UV write source is changed to bring them into alignment, and the feedback control signal is fed back to the UV write source;

to not write the diffraction pattern and if the feedback control signal indicates that the center wavelengths of the UV write source and the UV filter are not aligned, the logic output is zero and no change is made to the center wavelength of the UV write source, and if the feedback control signal indicates that the center wavelengths of the UV write source and the UV filter are aligned, then the feedback signal determines in which direction and by what amount the drive signal of the UV write source is changed to bring them out of alignment.

11. The method of claim 10, including directing IR light through the optical waveguide, wherein a written diffraction pattern in the optical waveguide deflects the IR light through the optical waveguide from a nondeflected path to a deflected path.

12. The method of claim 11, wherein the written diffraction pattern optical switch directionally couples infrared (IR) radiation traveling through the optical waveguide.

13. The method of claim 11, including selectively tapping a portion of the IR light is to read header information in an optical data stream which indicates a destination switch port of the optical data stream.

14. The method of claim 10, including turning off the UV write beam by detuning the center wavelength of the UV write source with respect to the center wavelength of the UV filter, which results in no grating being written in the optical waveguide.

15. The method of claim 10, including producing the dither signal at a low modulation frequency of kHz or less to avoid interference with other operating frequencies.

16. The method of claim 10, including detecting a portion of the output light from the filter, amplifying the detector electrical output signal, multiplying the detector electrical output signal with the dither signal to produce a cross product signal of the two signals, filtering the cross product signal, and integrating low pass filtered signals to obtain the feedback control signal which is, proportional to the offset between the center wavelength of the UV write source and the center wavelength of the UV filter.

17. The method of claim 10, including using a laser diode as the UV wavelength tunable diffraction grating write source.

* * * * *